Figure 1:
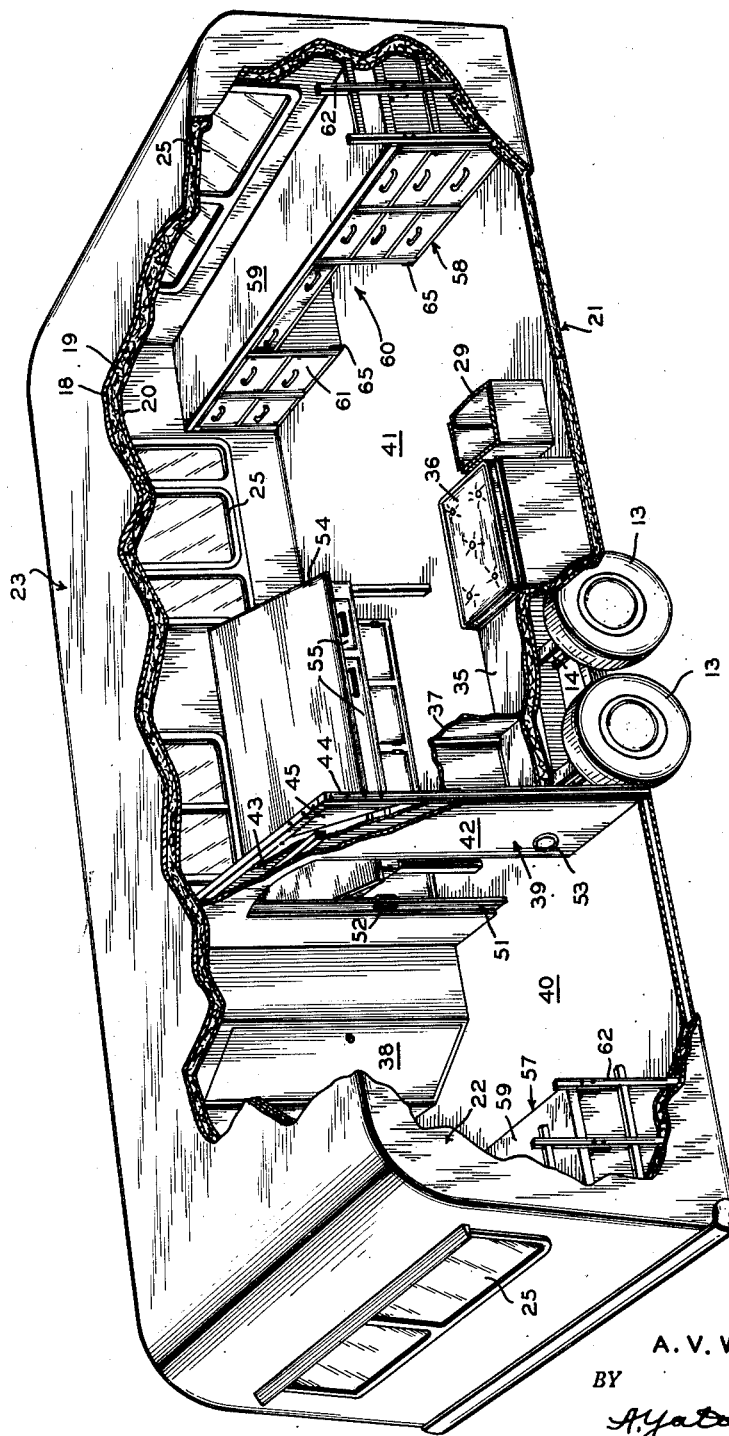

May 4, 1954  A. V. WILLIAMS  2,677,571
OFFICE TRAILER
Filed Feb. 19, 1952  2 Sheets-Sheet 1

INVENTOR.
A. V. WILLIAMS
BY
*A. Yates Dowell*
ATTORNEY

May 4, 1954 — A. V. WILLIAMS — 2,677,571
OFFICE TRAILER
Filed Feb. 19, 1952 — 2 Sheets-Sheet 2
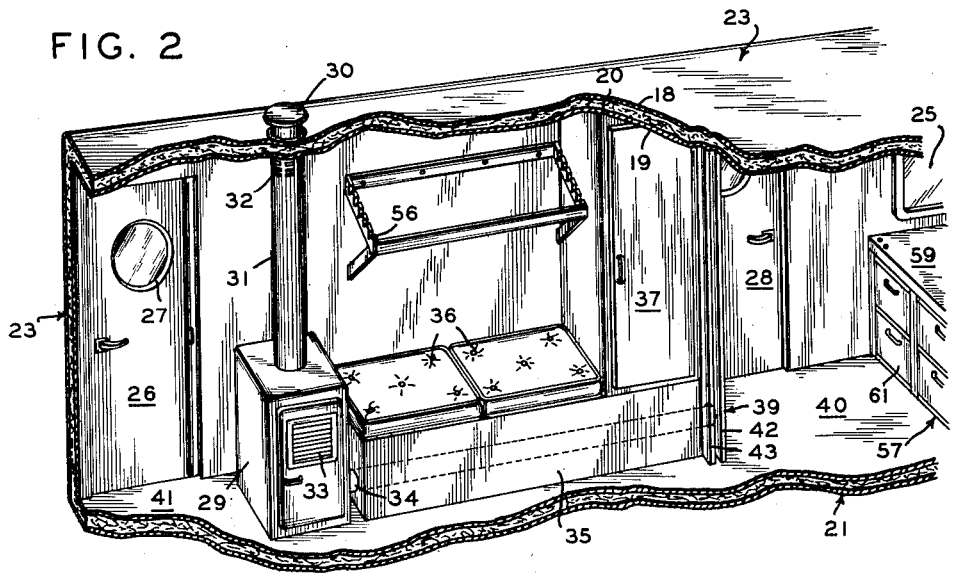
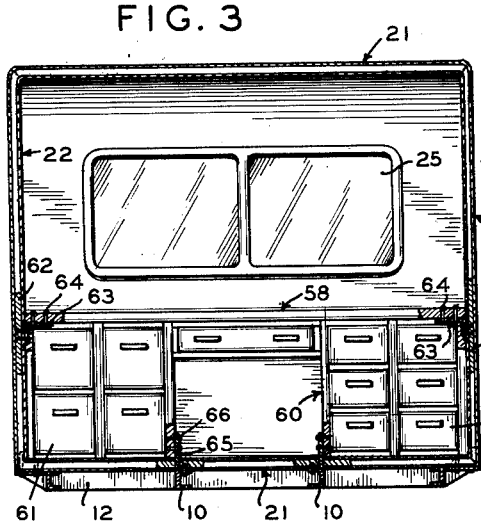
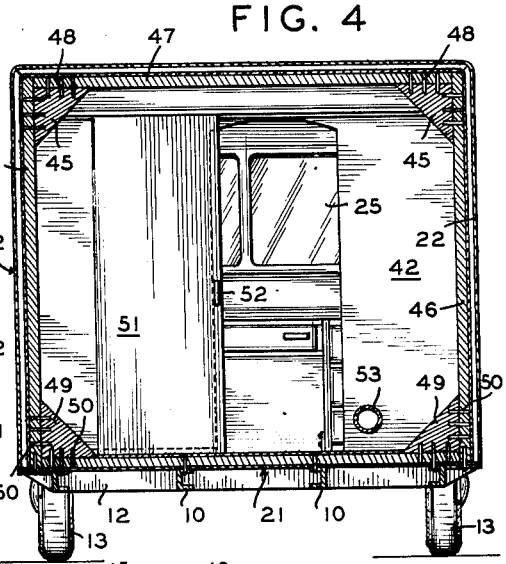
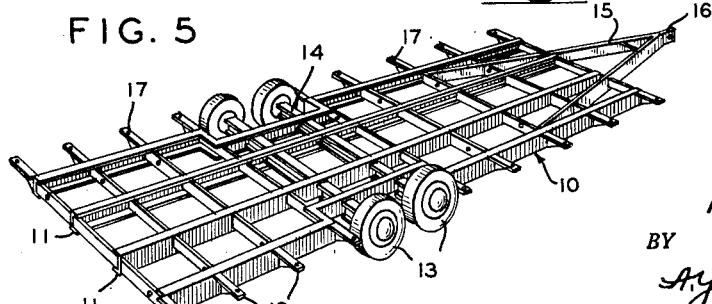
INVENTOR.
A. V. WILLIAMS
BY
ATTORNEY Patented May 4, 1954

2,677,571

UNITED STATES PATENT OFFICE 2,677,571

OFFICE TRAILER

Albert Vaughn Williams, Baltimore, Md.

Application February 19, 1952, Serial No. 272,365

1 Claim. (Cl. 296—24)

This invention relates to vehicles and more particularly to a trailer specifically designed to provide a portable office which may be located wherever such facilities are desired.

The invention further contemplates the incorporation of specific office equipment in a vehicle of the trailer type and in which such office equipment becomes an integral part of such vehicle and materially contributes to the structural strength thereof.

Heretofore trailers of the type contemplated by this invention have been constructed by providing a chassis and merely assembly thereon a shell to provide the necessary enclosure without the provision of any cross bracing or any other means to provide material structural strength. Consequently, after relatively short usage, particularly over rough roads, these trailers have required major overhauls with the consequent high cost of maintenance which this invention specifically avoids. Furthermore where these prior art trailers have been utilized to provide specialized vehicles such as might be utilized for office equipment it has been customary to merely place therein desks, drafting tables, file cabinets and other equipment which might be needed for the particular job at hand without any consideration whatsoever for the load distribution or for the fact that the structural strength characteristics of the trailer were not sufficient to take care of such equipment. Furthermore, there was no attempt whatsoever to tie in this equipment with the structural features of the trailer in order to provide additional strength and contribute to the useable life of such trailer thereby reducing maintenance costs.

It is therefore an object of this invention to provide a vehicle of the trailer type in which office equipment such as desks or the like is installed therein as a permanent part of the trailer structure and in which such equipment materially contributes to the structural strength of the trailer.

A further object of the invention is the provision of a vehicle of the trailer type in which the usual heating and sanitary facilities are provided and in which additional office facilities such as desks, drawing boards and the like are installed and further in which a dividing partition is specifically utilized to provide additional structural strength for the vehicle.

A still further object of the invention is the provision of a vehicle of the trailer type in which office equipment such as desks and the like may be installed and in which such equipment is integrally united with the trailer structure without necessitating major redesign or changes in such structure.

Another object of the invention is the provision of a vehicle of the trailer type in which a conventional partition normally installed in such vehicles is slightly modified to provide materially increased strength to the trailer structure.

Further objects and advantages of the invention will be apparent from the following description taken in conjunction with the accompanying drawings wherein:

Fig. 1 is a perspective view of a trailer constructed in accordance with this invention and with parts broken away to show the internal arrangement and structure of the vehicle;

Fig. 2, a fragmentary perspective view with parts broken away to show the internal arrangement of certain of the features of the vehicle;

Fig. 3, a transverse sectional view showing the manner of integrally uniting certain of the furniture in the vehicle with the structure thereof in order to provide additional strength;

Fig. 4, a transverse sectional view showing the manner of utilizing a dividing partition to impart additional strength to the structure of the vehicle; and Fig. 5, a perspective view showing the chassis on which the trailer of this invention is constructed.

With continued reference to the drawing there is shown in Fig. 5 a chassis 10 upon which the trailer of this invention may be constructed. Chassis 10 comprises a plurality of substantially parallel longitudinally extending beams 11 which are joined together into a substantially integral framework by cross members 12. The outer longitudinally extending beams 11 may be bent inwardly substantially centrally thereof to provide an opening for receiving ground engaging wheels 13. Wheels 13 may be journalled upon transversely extending I-beams or other suitable structural members 14 which are connected with the remainder of the chassis to provide sufficient strength to support the entire weight of the vehicle. At the forward end of the chassis 10 there may be provided a frame 15 which may be of A shape or any other design or configuration and the forward end 16 thereof may be provided with the usual trailer hitch to permit coupling the trailer to the towing vehicle. The longitudinal chassis frame members 11 may well be of channel cross section and the cross frame members 12 may be provided with apertures 17 adjacent the outer ends thereof for receiving suitable fastening means to secure the body of the vehicle thereto.

The entire body of the vehicle is provided by an outer skin 18 of sheet metal or other suitable material and an inner skin 20 spaced therefrom between which may be placed sound and heat insulating material 19. The plates or sheets forming the floor portion 21, the side portions 22 and the roof portion 23 may be united together by welding, riveting or the like to provide a substantially unitary structure and this entire assembly may be prefabricated and installed on the chassis 10 as a unit. The side wall portions 22 and the end wall portions 24 may be provided with suitable windows 25 certain of which may be opened to provide sufficient light and ventilation for the interior of the vehicle.

A door 26 may be provided in one of the side walls 22 and in order to provide additional illumination a window 27 may also be incorporated in the door. If desired additional access means in the form of a door 28 may also be incorporated in one of the side walls 22 but such additional door is not necessary to this invention.

The interior of the trailer of this invention may be provided with several of the usual facilities and conveniences found therein such as a heating stove 29 which may be provided with a vent 30 extending through the roof 23 of the vehicle to the atmosphere, this vent 30 being provided with a jacket 31 and air outlets 32 adjacent the upper end thereof to dissipate heated air to the interior of the vehicle. Stove 29 may also be provided with air outlet louvers 33 for dissipating additional heated air to the interior of the vehicle and there may also be provided a conduit 34 connected to the stove 29 for conducting heated air to another part of the vehicle which may be partitioned therefrom. Also a seat 35 may be provided having cushions 36 thereon and a closet for enclosure 37 for receiving garments or for other storage purposes may be provided and likewise another closet or enclosure 38 may be provided in another part of the vehicle.

A partition 39 may be provided to divide the vehicle into two compartments 40 and 41 and as shown in Figs. 1 and 4 partition 39 may well comprise spaced panels 42 and 43 supported by a generally rectangular frame 44. Frame 44 as shown in Fig. 4 is provided at the corners thereof with gusset plates 45 which are secured to upper cross member 47 and side members 46 by screw threaded fastening means, rivets or the like 48, frame 44 also being provided with gusset plates 49 for securing the frame and panels 42 and 43 to the floor 21 and the cross chassis members 17. Gusset plates 49 may be secured to the side frame members 46 and the floor 21 and cross frame members 17 by screw threaded fastening means, rivets or the like 50. It will thus be seen that frame 44 together with panels 42 and 43 constitute a cross bracing structure which materially contributes to the strength of the framework of the vehicle and prevents weaving and consequent structural failures in the body of the vehicle. In order to permit convenient passage to and from the compartments 40 and 41 a sliding door 51 may be provided in the partition 39, this door 51 being conveniently operated by handles 52. Since partition 39 divides the vehicle into two compartments 40 and 41 the hot air conduit 34 is extended through this partition and an outlet louver 53 is provided therein in order to heat the compartment 40.

The compartment 41 being the larger of the two compartments may include a drafting table 54 provided with the usual drawers 55 for receiving drafting equipment and the like and on the opposite side of the vehicle there may be provided a rack 56 for receiving completed drawings or blue prints which it may be necessary to refer to at frequent intervals.

Since the vehicle of this invention is primarily designed to provide portable office space which may be moved from place to place as such facilities are required, it is an important part of the invention that desks are supplied in each compartment 40 and 41 of the vehicle which, if necessary, can be separated by the partition 39 and door 51 to provide at least two private office spaces. These desks 57 and 58 may be located in each end of the vehicle and as best shown in Figs. 1 and 3 may comprise a relatively unimpeded top portion 59 having a knee hole space 60 therebeneath and may also be provided with suitable drawers 61 for receiving papers or other desired paraphernalia. The desks 57 and 58 are constructed as integral units and secured to the studs 62 supporting the side walls 22 of the vehicle by angle irons or other suitable structural members 63. These angle irons may be secured to the desk tops and to the studs 62 by rivets, screw threaded fastening means or the like 64 and also the desks are secured to the central longitudinal chassis members 11 by angle irons or the like 65. These angle irons may be secured to the desks and to the chassis frame members 11 by rivets, screw threaded fastening members or the like 66.

Desks 57 and 58 thus become substantially integral parts of the vehicle and materially contribute to the structural strength thereof which prevents bending or weaving of the parts of the vehicle and thus material prevents failure of these parts and consequent high maintenance costs.

It will thus be seen that by the above described invention there has been provided a vehicle of the trailer type in which particular equipment such as that needed for a portable office is installed and in which such equipment becomes an integral part of the vehicle and materially contributes to the structural rigidity and strength thereof. This installation has been accomplished without in any way sacrificing convenience or ease in manufacture and in addition the conventional partition normally supplied in such vehicles has been modified to provide additional structural rigidity to the vehicle. The installation of the equipment contemplated by this invention may be made without in any way increasing the difficulties or cost of manufacture and consequently a vehicle particularly adapted for the needs presented by a portable office is solved by this invention and at the same time a vehicle of the trailer type of superior and long wearing quality is provided.

It will be obvious to those skilled in the art that various changes may be made in the invention without departing from the spirit and scope thereof and therefore the invention is not limited by that which is shown in the drawings and described in the specification but only as indicated in the appended claim.

What is claimed is:

A trailer vehicle body comprising stringers extending substantially the length thereof, means for mounting wheels from said stringers intermediate the ends of the stringers and the body for supporting said trailer body, upright studding extending from said stringers defining the outside walls of the trailer, sheet material rigid in the plane of the sheet material fixed to the studding to form rigid walls for closing the body and maintaining the spacing of the studding for reinforcing the walls against vertical bending, a rigid roof supported upon said studding and fixedly connected thereto providing an integral structure with said stringers, an upstanding rigid partition extending across said vehicle adjacent the wheels and intermediate the ends of the vehicle and fixedly connected to said stringers, side walls, and roof for supporting the roof and rigidifying the body, said partition having a passageway therethrough of substantially less width and height than said partition, a one-piece desk top of a width sufficient to accommodate a seated person, mounted at each end of the vehicle extending completely across said vehicle and to the adjacent end of the vehicle and secured to the studding of the side walls and providing a knee hole below each of said desk tops, said partition and desk tops serving to rigidify said body whereby the total structural weight may be kept to a minimum.

References Cited in the file of this patent

UNITED STATES PATENTS

| Number | Name | Date |
|---|---|---|
| D. 114,385 | Wells | Apr. 18, 1939 |
| 302,844 | Hoffman | July 29, 1884 |
| 1,519,093 | Weymann | Dec. 9, 1924 |
| 1,910,397 | Lewis | May 23, 1933 |
| 2,235,662 | Arehart | Mar. 18, 1941 |
| 2,239,089 | Fageol | Apr. 22, 1941 |

FOREIGN PATENTS

| Number | Country | Date |
|---|---|---|
| 159,728 | Great Britain | Mar. 10, 1921 |

OTHER REFERENCES

"Detailed Super-Harbor Construction Applications," publication by Harbor Plywood Corporation. Received January 23, 1945, page 10.